US008843863B2

(12) United States Patent  
Kobayashi

(10) Patent No.: US 8,843,863 B2  
(45) Date of Patent: Sep. 23, 2014

(54) APPARATUS, METHOD AND COMPUTER PROGRAM FOR MANAGING CIRCUIT OPTIMIZATION INFORMATION

(75) Inventor: Noriyuki Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1061 days.

(21) Appl. No.: 12/150,566

(22) Filed: Apr. 29, 2008

(65) Prior Publication Data

US 2008/0307373 A1 Dec. 11, 2008

(30) Foreign Application Priority Data

May 2, 2007 (JP) ................................ 2007-121407

(51) Int. Cl.
*G06F 9/455* (2006.01)
*G06F 17/50* (2006.01)

(52) U.S. Cl.
CPC ........ G06F 17/5036 (2013.01); G06F 17/5063 (2013.01); *G06F 2217/08* (2013.01)
USPC ........... 716/106; 716/102; 716/110; 716/132; 716/136

(58) Field of Classification Search
USPC ......... 716/102, 106–108, 110–115, 132–135, 716/136
See application file for complete search history.

(56) References Cited

U.S. PATENT DOCUMENTS

| | | | | |
|---|---|---|---|---|
| 5,953,519 | A | * | 9/1999 | Fura ............................... 716/104 |
| 6,389,379 | B1 | * | 5/2002 | Lin et al. ......................... 703/14 |
| 6,651,225 | B1 | * | 11/2003 | Lin et al. ........................ 716/113 |
| 6,785,873 | B1 | * | 8/2004 | Tseng ............................. 716/102 |
| 7,076,415 | B1 | * | 7/2006 | Demler et al. .................. 703/14 |
| 2006/0117274 | A1 | * | 6/2006 | Tseng et al. ...................... 716/1 |

FOREIGN PATENT DOCUMENTS

| | | |
|---|---|---|
| JP | 05-054094 A | 3/1993 |
| JP | 05-174092 A | 7/1993 |
| JP | 07-066294 A | 3/1995 |
| JP | 10-312405 A | 11/1998 |
| JP | 11-085822 | 3/1999 |
| JP | 2002-324097 A | 11/2002 |
| JP | 2005-055960 | 3/2005 |
| JP | 2006-178775 A | 7/2006 |
| JP | 2007-213232 A | 8/2007 |

* cited by examiner

*Primary Examiner* — Nha Nguyen
(74) *Attorney, Agent, or Firm* — Sony Corporation

(57) ABSTRACT

A circuit optimization information management apparatus provides information to be used when a circuit parameter optimization program is executed to design an integrated circuit. The apparatus includes an accumulator for registering information relating to a candidate of a circuit type used in a design target circuit, a simulation test bench circuit corresponding to the circuit type, a simulation test input waveform and a circuit performance evaluation function for evaluating simulation results, and a feeder for selecting, in response to selection of the circuit type used in the design target circuit, information relating to the test bench circuit, the test input waveform and the performance evaluation function, corresponding to the selected circuit type registered in the accumulator and feeding the selected information to the circuit parameter optimization program.

12 Claims, 14 Drawing Sheets

FIG. 2

| CIRCUIT TYPE | TEST BENCH | INPUT WAVEFORM | PERFORMANCE EVALUATION FUNCTION |
|---|---|---|---|
| OpAmp | • A : DC ANALYSIS<br>• B : AC ANALYSIS<br>• C : TRANSITION ANALYSIS | • BIAS INPUT<br>• AC SIGNAL<br>• RECTANGULAR WAVE/ SINUSOIDAL WAVE | • Voltage : VDC("/OUT")<br>• Current : abs(IDC("/V0/PLUS"))<br>• Gain : value(dB20(mag(VF("/OUT"))1)<br>• . . . |
| VOLTAGE REFERENCE CIRCUIT | ... | ... | ... |
| ADC CIRCUIT | ... | ... | ... |
| ... | ... | ... | ... |

FIG. 4

OPERATIONAL AMPLIFIER PERFORMANCE EVALUATION FUNCTION

- AC ANALYSIS (AC)
  - Current :     abs(IDC("/V0/PLUS"))
  - Gain :     value (dB20(mag(VF("/OUT"))) 1)
  - Unity Gain Frequency : cross (dB20(mag(VF("/OUT"))) 0 1 "falling")
  - PhaseMargin :     phaseMargin(VF("/OUT"))

- TRANSITION ANALYSIS (Tran)
  - SettlingTime :     settlingTime(VT("/OUT") - 0.9 nil 0.9 nil 10)
  - Swing :     (value(VT("/OUT") 10e - 09) - value(VT("/OUT") 1e - 09)

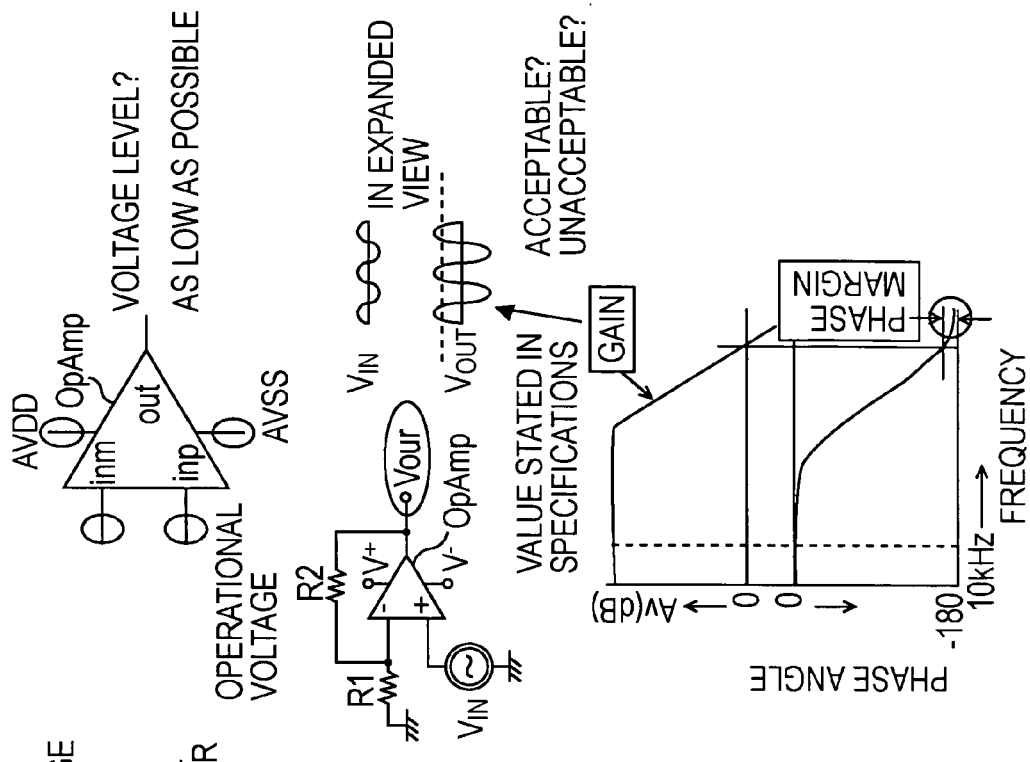

FIG. 5

OPERATIONAL AMPLIFIER

- DC ANALYSIS (INPUT AND OUTPUT ARE ONE OF SINGLE VOLTAGE VALUE AND CURRENT VALUE RATHER THAN WAVEFORM)
  - DC OFFSET
    INPUT:   APPLY OPERATION VOLTAGE TO EACH TERMINAL
    OUTPUT: out VOLTAGE, THE CLOSER TO ZERO, THE BETTER
    CONDITIONS : vdc("/out") < 1mV

- AC ANALYSIS
  - GAIN AT 1 kHz
    INPUT:   LOW AC VOLTAGE SIGNAL IS INPUT BETWEEN
             inp AND inm TERMINALS
    OUTPUT : out VOLTAGE AMPLITUDE WAVEFORM
    CONDITIONS : value (dB20(mag(VF("/OUT"))) 1k)

- PHASE MARGIN
    INPUT : LOW AC VOLTAGE SIGNAL IS INPUT BETWEEN
            inp AND inm TERMINALS
    OUTPUT : out VOLTAGE AMPLITUDE WAVEFORM AND
             PHASE WAVEFORM
    CONDITIONS : phaseMargin(VF("/OUT")) > 60°

FIG. 7
ANALOG TO DIGITAL CONVERTER
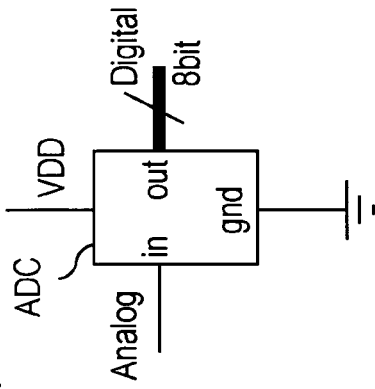
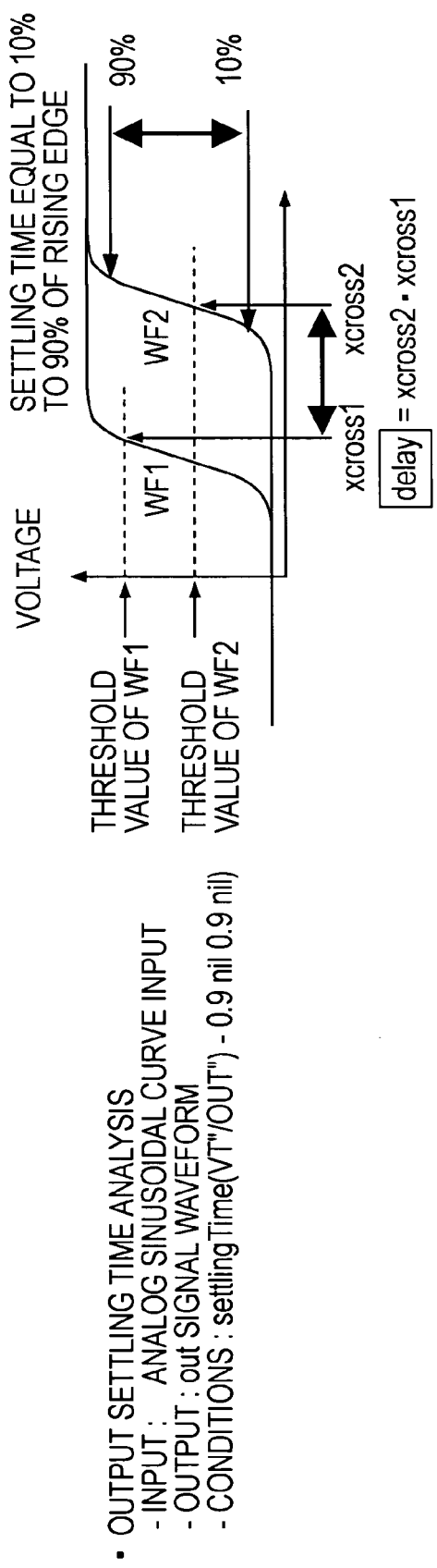
- INPUT-OUTPUT RESPONSE TIME ANALYSIS
  - INPUT : ANALOG SINUSOIDAL CURVE INPUT
  - OUTPUT : out SIGNAL WAVEFORM
  - CONDITIONS : delay(VT("/out") VT("/in") Vth1 Vth2)
- OUTPUT SETTLING TIME ANALYSIS
  - INPUT : ANALOG SINUSOIDAL CURVE INPUT
  - OUTPUT : out SIGNAL WAVEFORM
  - CONDITIONS : settlingTime(VT("/OUT") - 0.9 nil 0.9 nil)

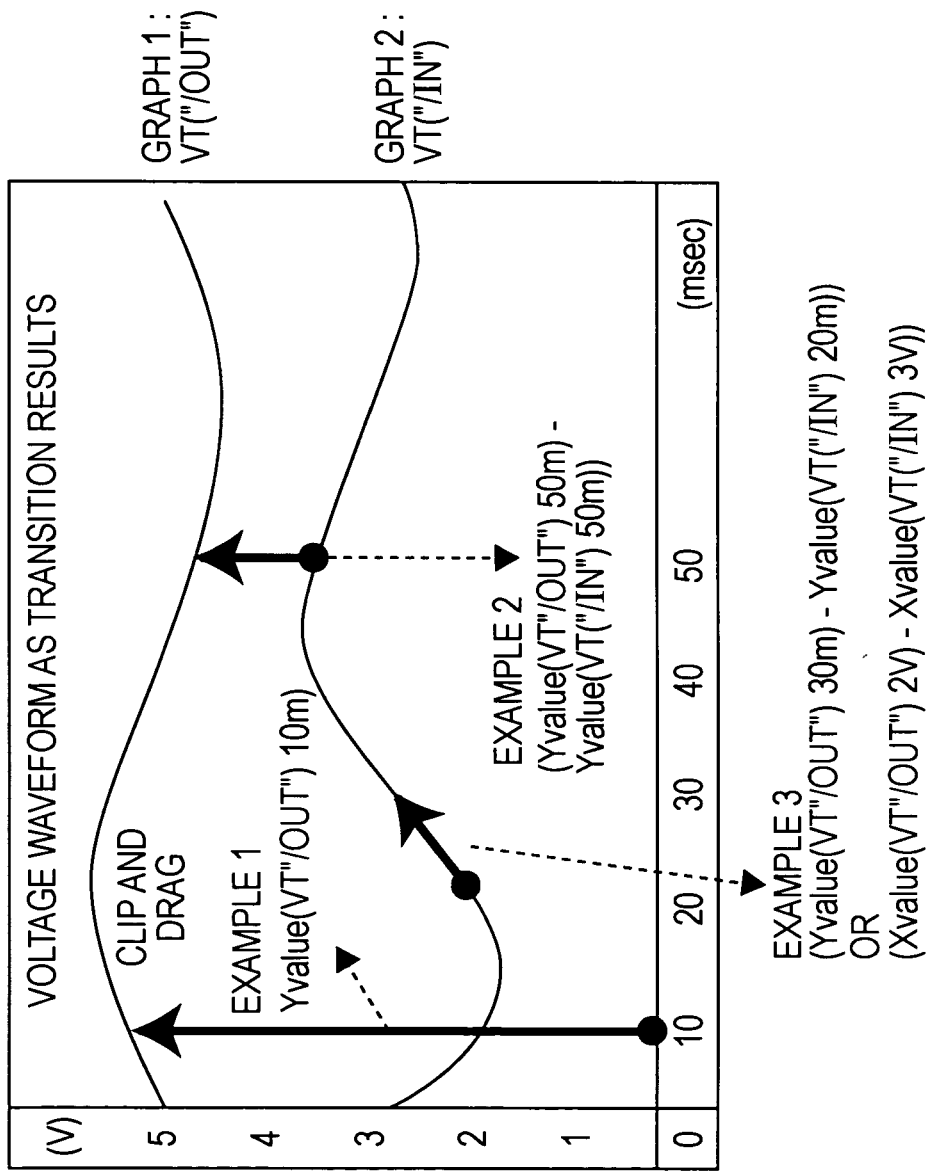

APPARATUS, METHOD AND COMPUTER PROGRAM FOR MANAGING CIRCUIT OPTIMIZATION INFORMATION

CROSS REFERENCES TO RELATED APPLICATIONS

The present invention contains subject matter related to Japanese Patent Application JP 2007-121407 filed in the Japanese Patent Office on May 2, 2007, the entire contents of which are incorporated herein by reference.

BACKGROUND OF THE INVENTION

1. Field of the Invention

The present invention relates to an apparatus, method and computer program for managing circuit optimization information that is used when a circuit parameter optimization program is used in the designing of an integrated circuit.

2. Description of the Related Art

Simulation is performed to evaluate performance of a design target circuit in analog integrated circuits. A circuit parameter optimization program is used in the simulation.

The circuit parameter optimization program is an electronic design automation (EDA) tool. The EDAM tool automatically determines circuit parameter values of a design target circuit, such as a size, resistance, and capacitance of a transistor, to achieve a preset circuit performance target.

Input to the circuit parameter optimization program includes information relating to a design target circuit, a simulation test bench circuit for measuring performance, simulation test input waveform, circuit performance evaluation function, circuit performance target value, designation of a variable value and range of the value. Output of the circuit parameter optimization program includes a design target circuit with the circuit parameter values thereof optimized and circuit performance evaluation results (simulation results).

The test bench and the performance evaluation function, used in design, are stored in a circuit parameter optimization program.

The performance evaluation function fed to the circuit parameter optimization program may be registered beforehand in a database (DB) and may be added to the DB subsequent to optimization.

Japanese Unexamined Patent Application Publication No. 2005-55960 discloses a recording medium that stores a "test bench," a "test input waveform," and "circuit specifications" with circuit topology associated therewith to optimize circuit parameter values.

SUMMARY OF THE INVENTION

A user needs to produce the test bench and the performance evaluation function each time the test bench and the performance evaluation function, used in designing, are stored in the circuit parameter optimization program.

In a simulation of verifying the performance evaluation with a resulting waveform, the user transfers the performance specifications to the circuit parameter optimization program. In this case, the user visually checks a determination as to whether specifications are acceptable or not expresses, expresses the determination as the performance evaluation function, and then inputs the performance evaluation function to the circuit parameter optimization program.

The user may prepare beforehand a fixed performance evaluation function as the performance evaluation function to be registered in the database. Such a performance evaluation function is not flexible.

A variety of specifications is expressed by performance evaluation functions in designing. An evaluation function for measuring a resulting waveform graph at any point is produced at any measurement point on a graph.

With this method, the user cannot enter a new measurement point on design specifications (performance evaluation function) without knowledge of a format of the performance evaluation function representing the measurement point.

With the technique disclosed in Japanese Unexamined Patent Application Publication No. 2005-55960, the user cannot enter the measurement point to the circuit parameter optimization program because a circuit specification portion is not represented by a performance evaluation function.

To enter directly the performance evaluation function onto the circuit parameter optimization program, the user needs to perform a manual operation with knowledge of the format. Input information is largely dependent on skill level of the design engineer. Simulation results are also dependent on the skill level of the design engineer.

It is thus desirable to provide a circuit optimization information management apparatus, method and program for allowing a correct performance evaluation function to be directly input onto the circuit parameter optimization program without any complex manual operation and resulting in an optimized design target circuit free from variations independently of the skill level of the design engineer.

In accordance with one embodiment of the present invention, a circuit optimization information management apparatus for providing information to be used when a circuit parameter optimization program is executed to design an integrated circuit, includes an accumulator for registering information relating to a candidate of a circuit type used in a design target circuit, a simulation test bench circuit corresponding to the circuit type, a simulation test input waveform and a circuit performance evaluation function for evaluating simulation results, and a feeder for selecting, in response to selection of the circuit type used in the design target circuit, information relating to the test bench circuit, the test input waveform and the performance evaluation function, corresponding to the selected circuit type registered in the accumulator and feeding the selected information to the circuit parameter optimization program.

The circuit optimization information management apparatus may include a register for generating a desired performance evaluation function based on information that accounts for performance evaluation results from simulation by the circuit parameter optimization program and registering the generated performance evaluation function with the corresponding circuit type in association therewith.

The register may extract at least one specified waveform equation from the simulation results, generate an equation by adding, to the waveform equation, coordinates information responsive to specified information, and register the generated equation as a performance evaluation function corresponding to the circuit type.

In accordance with one embodiment of the present invention, a circuit optimization information management method for providing information to be used when a circuit parameter optimization program is executed to design an integrated circuit, includes steps of registering information relating to a candidate of a circuit type used in a design target circuit, a simulation test bench circuit corresponding to the circuit type, a simulation test input waveform and a circuit performance evaluation function for evaluating simulation results, selecting, in response to selection of the circuit type used in the design target circuit, information relating to the test bench circuit corresponding to the registered and selected circuit type, the test input waveform and the performance evaluation function and feeding the selected information to the circuit parameter optimization program.

In accordance with one embodiment of the present invention, a computer program for causing a computer to perform a circuit optimization information management method for providing information to be used when a circuit parameter optimization program is executed to design an integrated circuit, includes steps of registering information relating to a candidate of a circuit type used in a design target circuit, a simulation test bench circuit corresponding to the circuit type, a simulation test input waveform and a circuit performance evaluation function for evaluating simulation results, selecting, in response to selection of the circuit type used in the design target circuit, information relating to the test bench circuit corresponding to the registered and selected circuit type, the test input waveform and the performance evaluation function and feeding the selected information to the circuit parameter optimization program.

In accordance with embodiments of the present invention, when a circuit type of a design target circuit is selected from a list of circuit types defined beforehand, the simulation test bench circuit for the design target circuit, the test input waveform and the circuit performance evaluation function from the simulation results are output.

In accordance with embodiments of the present invention, the appropriate performance evaluation function is input to the circuit parameter optimization program without any complex manual operation in a manner free from the skill level of the design engineer, and the optimized design target circuit free from variations is provided.

BRIEF DESCRIPTION OF THE DRAWINGS

FIG. 2 illustrates a variety of information registered on a database in an input generation information accumulator in accordance with one embodiment of the present invention;

FIGS. 4A-4D illustrate performance evaluation functions of operational amplifiers in accordance with one embodiment of the present invention;

FIG. 5 illustrates generalized input and output of an operational amplifier and conditions thereof in accordance with one embodiment of the present invention;

FIG. 7 illustrates generalized input and output of an analog-to-digital (ADC) circuit and conditions thereof in accordance with one embodiment of the present invention;

FIG. 14 illustrates a generation of the performance evaluation function based on the simulation results.

DESCRIPTION OF THE PREFERRED EMBODIMENTS

The embodiments of the present invention are described below with reference to the drawings.

Figure 1:
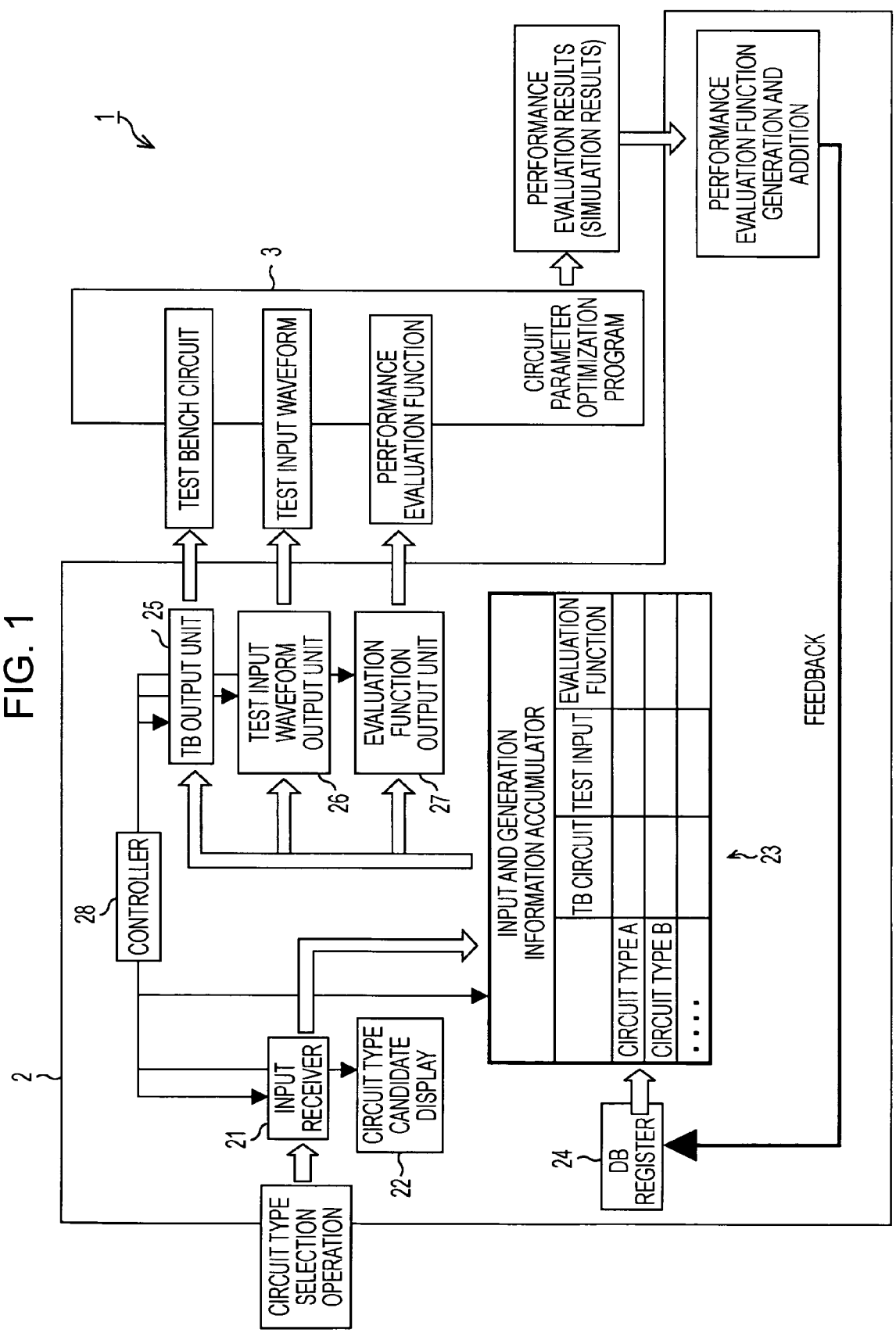
FIG. 1 is a block diagram of a circuit optimization information management apparatus in accordance with one embodiment of the present invention.

FIG. 1 is a block diagram illustrating a circuit optimization information management system 1 in accordance with one embodiment of the present invention.

The circuit optimization information management system 1 includes a circuit optimization information management apparatus 2 and a circuit parameter optimization program 3.

The circuit optimization information management apparatus 2 includes an input receiver 21, a circuit type candidate display 22, an input and generation information accumulator 23, a database (DB) register 24, a test bench (TB) output unit 25, a test input waveform output unit 26, a test input waveform output unit 26, an evaluation function output unit 27 and a controller 28.

A basic function of the circuit optimization information management system 1 of FIG. 1 is described, followed by the description of circuit type information, test bench (TB) circuit information, test input waveform information and evaluation function information, stored on the input and generation information accumulator 23.

At registration on the database, the input receiver 21 receives the circuit type information, the test bench circuit information, the test input waveform information and the evaluation function information, input via an input unit (not shown), such as one of a mouse and a keyboard, and then supplies the received information to the input and generation information accumulator 23.

The input receiver 21 under the control of the controller 28 receives the circuit type information input by the input unit (not shown), such as one of a mouse and a keyboard and then supplies the received circuit type information to the input and generation information accumulator 23.

The display 22, including a liquid-crystal display (LCD) or the like, is controlled by the controller 28. The display 22 displays a circuit type candidate, information supplied to the circuit parameter optimization program 3 in accordance with a selected circuit type, and information relating to simulation execution and results of the circuit parameter optimization program 3.

The input and generation information accumulator 23, under the control of the controller 28, stores the circuit type information, the test bench circuit information, the test input waveform information and the evaluation function information, received by the input receiver 21, and stores as a database responsive to the circuit type.

The information stored on the input and generation information accumulator 23 may be added, updated, and deleted.

The input and generation information accumulator 23 also registers the performance evaluation function generated by the DB register 24.

The input and generation information accumulator 23 under the control of the controller 28 reads the test bench circuit information, the test input waveform information and the evaluation function information, responsive to the circuit type information input via the input receiver 21 and outputs to the circuit parameter optimization program 3 the test bench circuit information, the test input waveform information and the evaluation function information respectively via the TB output unit 25, the test input waveform output unit 26 and the evaluation function output unit 27.

The register 24 generates a desired performance evaluation function equation based on information that accounts for the performance evaluation results obtained through a simulation performed by the circuit parameter optimization program 3. The register 24 then registers the performance evaluation function equation with the circuit type associated therewith, the circuit type being specified by the user and received by the input receiver 21 and stored one the input and generation information accumulator 23.

The generation and registration process of the performance evaluation function equation are described below.

The TB output unit 25 under the control of the controller 28 outputs to the circuit parameter optimization program 3 the test bench circuit information read from the input and generation information accumulator 23.

The test input waveform output unit 26 under the control of the controller 28 outputs to the circuit parameter optimization program 3 the test input waveform information read from the input and generation information accumulator 23.

The evaluation function output unit 27 under the control of the controller 28 outputs to the circuit parameter optimization program 3 the performance evaluation function information read from the input and generation information accumulator 23.

The controller 28 generally controls the circuit optimization information management system 1 including the circuit optimization information management apparatus 2.

The circuit parameter optimization program 3 contains therewithin a simulation program for simulating a design target circuit. The circuit parameter optimization program 3 may also have the simulation program available from the outside. With the simulation program, the circuit parameter optimization program 3 performs a simulation process to measure performance of a design target circuit (using a "test input waveform," and a "test bench"). By multiplying a "performance evaluation function" by the simulation results (such as waveform), the circuit parameter optimization program 3 determines whether specifications are acceptable. If the specifications are not acceptable, the circuit parameter optimization program 3 repeats the simulation process with different circuit parameters input by the user until the simulation results become acceptable. Even if the simulation results are acceptable, the simulation process may be repeated until even better results are obtained.

The basic structure and function of the circuit optimization information management system 1 have been described.

The circuit type information, the test bench circuit information, the test input waveform information and the evaluation function information, stored on the input and generation information accumulator 23, are described below.

As described above, the circuit optimization information management system 1 of one embodiment of the present invention includes the input and generation information accumulator 23 as a database system that contains the "performance evaluation function" used by the circuit parameter optimization program 3.

The circuit optimization information management system 1 stores a candidate of a circuit type to be used in the design target circuit and information corresponding to the circuit type candidate. The information corresponding to the circuit type candidate contains information relating to a simulation test bench circuit, a simulation test input waveform and a circuit performance evaluation function evaluating the simulation results. The circuit optimization information management system 1 also contains a registration system for the database of these pieces of information. The registration system registers in the database thereof the circuit type, and the test bench circuit, the test input waveform and the performance evaluation function corresponding to that circuit type.

FIG. 2 lists a variety of information to be database registered in the input and generation information accumulator 23 in accordance with one embodiment of the present invention.

Circuit types, the circuit parameters of which are to be optimized by the circuit parameter optimization program 3, include an operational amplifier (OpAmp), a voltage reference circuit and an analog-to-digital (ADC) circuit.

The test bench circuit information may contain a direct-current analysis as an item A, an alternating current analysis as an item B and a transition analysis as an item C.

The input waveform information contains a bias input, an AC signal, a rectangular wave, a sinusoidal wave, etc.

The performance evaluation function information contains voltage, current, gain and condition equation.

As shown in FIG. 2, the condition equation of voltage is VDC ("/V0/PLUS"), the condition equation of current is abs(IDC("/OUT")), the condition equation of gain is value (dB(magi(VF("/OUT")))1).

In the DC analysis, an input or an output signal is a single voltage value or current value rather than an input or output waveform.

The circuit optimization information management system 1 of one embodiment of the present invention registers a test bench in a format matching each simulation environment, data of a waveform input to the simulation environment, and a performance evaluation function readable by an optimization program used.

These data units are sorted according to circuit type.

FIGS. 3A-3D illustrate test bench circuits as operational amplifiers (OpAmp) and test input waveform information.

Figure 3C:
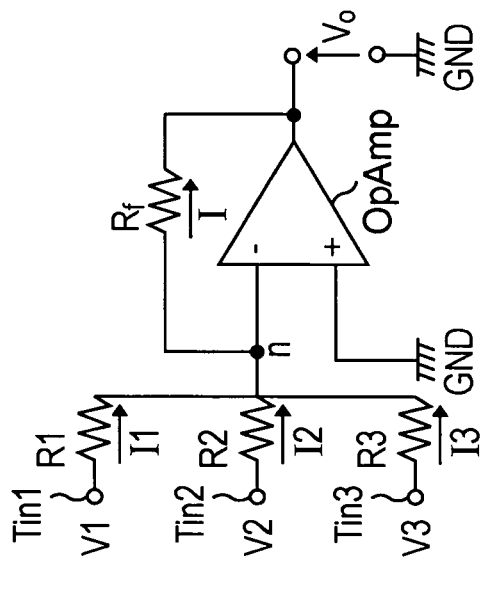
FIG. 3 illustrates a test bench circuit and a test input waveform of an operational amplifier in accordance with one embodiment of the present invention.
Figure 3D:
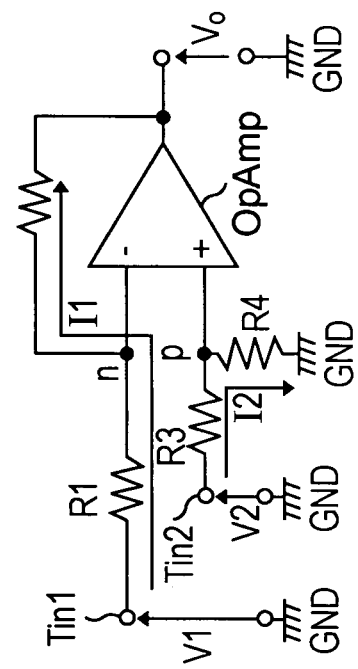
Figure 3A:
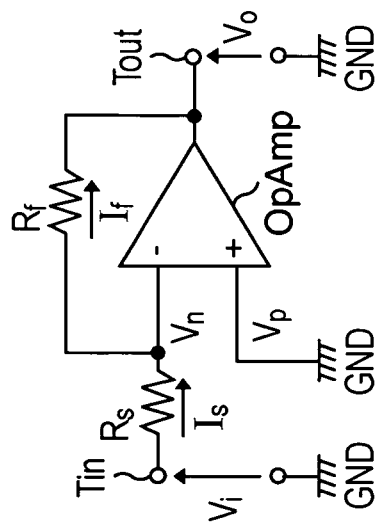

FIG. 3A illustrates an inverting amplifier 4 as an operational amplifier.

In the inverting amplifier 4, a resistor Rs is connected between an inverting input terminal (−) of the operational amplifier OpAmp and an input terminal Tin, a resistor Rf is connected between an output terminal and the inverting input terminal (−), and a non-inverting input terminal (+) is grounded.

The test bench circuit information of the inverting amplifier 4 is information related to elements such as the resistors Rs and Rf other than the operational amplifier OpAmp.

Figure 3B:
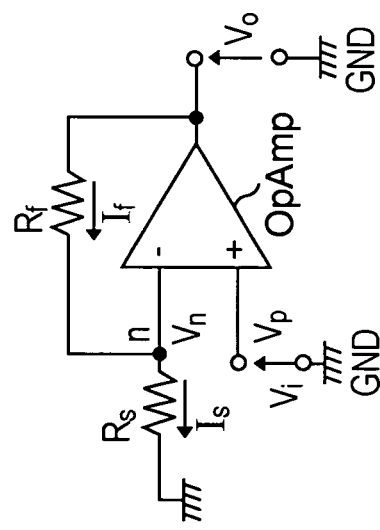

FIG. 3B illustrates a non-inverting amplifier 5 as an operational amplifier.

In the non-inverting amplifier 5, a resistor Rs is connected between an inverting input terminal (−) of the operational amplifier OpAmp and ground GND, a resistor Rf is connected between an output terminal and the inverting input terminal (−), and a non-inverting terminal (+) is connected to an input terminal Tin.

The test bench circuit information of the non-inverting amplifier 5 is information relating to elements such as the resistors Rs and Rf other than the operational amplifier OpAmp.

FIG. 3C illustrates an adder 6 as an operational amplifier OpAmp.

In the adder 6, resistors R1, R2 and R3 are connected between each of an inverting input terminal (−) and input terminals Tin1, Tin2 and Tin3, respectively. A resistor Rf is connected between an output terminal and the inverting input terminal (−), and a non-inverting input terminal (+) is grounded.

The test bench circuit information of the adder 6 is information related to elements such as the resistors R1, R2 and R3 other than the operational amplifier OpAmp.

FIG. 3D illustrates a subtractor 7 as an operational amplifier OpAmp.

In the subtractor 7, a resistor R1 is connected between an inverting input terminal (−) of the operational amplifier OpAmp and an input terminal Tin, a resistor R2 is connected between the inverting input terminal (−) and an output terminal of the operational amplifier OpAmp, and a resistor R3 is connected between a non-inverting input terminal (+) of the operational amplifier OpAmp and an input terminal Tin2. A resistor R4 is connected between the non-inverting input terminal (+) and ground GOD.

The test bench circuit information of the subtractor 7 is information relating to elements such as the resistors R1, R2, R3 and R4, etc. other than the operational amplifier OpAmp.

The test input waveform information of the operational amplifier OpAmp includes input Vi information, voltage amplitude information, and frequency information. The input Vi information indicates whether the input is a sinusoidal wave or a rectangular wave. The voltage amplitude information indicates the voltage of the input signal, such as 3.3 V, 5 V, or 12 V. The frequency information indicates the frequency of the input signal, such as 10 kHz, 1 MHz, or 100 MHz.

Information of FIG. 4 discussed below is used as the performance evaluation function of the operational amplifier OpAmp.

In the AC analysis, the condition equation of current is abs(IDC("/V0/PLUS")), the condition equation of gain is value(dab(mag(VF("/OUT")))1), the condition equation of unity gain frequency cross(dB20(mag(VF("/OUT"))) 01"falling"), and the condition equation of phase margin is phaseMargin(VF("/OUT")).

In the transition analysis, the condition equation of settling time is setting time (VT("/OUT")−0.9 nil 0.9 nil 10), and the condition equation of voltage swing is (value(VT("/OUT") 10 e-0.9)—value(VT("/OUT") le-09)).

In the above discussion, the circuit types include the operational amplifier OpAmp, the voltage reference circuit and the ADC circuit. The input and output of the operational amplifier OpAmp and the condition equation have been discussed as the performance evaluation function.

The generalized input and output of each of the operational amplifier OpAmp, the voltage reference circuit and the ADC circuit and condition examples are described below with reference to FIGS. 5-7.

FIG. 5 illustrates the generalized input and output and the conditions of the operational amplifier. FIG. 6 illustrates the generalized input and output and the conditions of the voltage reference circuit. FIG. 7 illustrates the generalized input and output and the conditions of the ADC circuit.

FIG. 5 illustrates the DC analysis and the AC analysis of the operational amplifier OpAmp.

In the DC analysis, a DC offset value is analyzed as a single voltage value or a single current value rather than an input or output waveform. Operational voltages are applied to respective input terminals. The output voltage of the operational amplifier OpAmp is an out voltage. The closer to zero the output voltage, the better. The condition equation is vdc("/out")<1 mV.

In the AC analysis, gain and phase margin are analyzed.

A low-level AC voltage signal is input between inp and inm terminals for gain analysis at 1 kHz. An output of the operational amplifier is an out voltage amplitude waveform. A condition equation is value(dB20(mag(VF("/OUT")))1 k).

A low-level AC voltage signal is input between inp and inm terminals in phase margin analysis. An output of the operational amplifier is an out voltage amplitude waveform and a phase waveform. A condition equation is phase Margin (VF ("/OUT"))>60.

Figure 6:
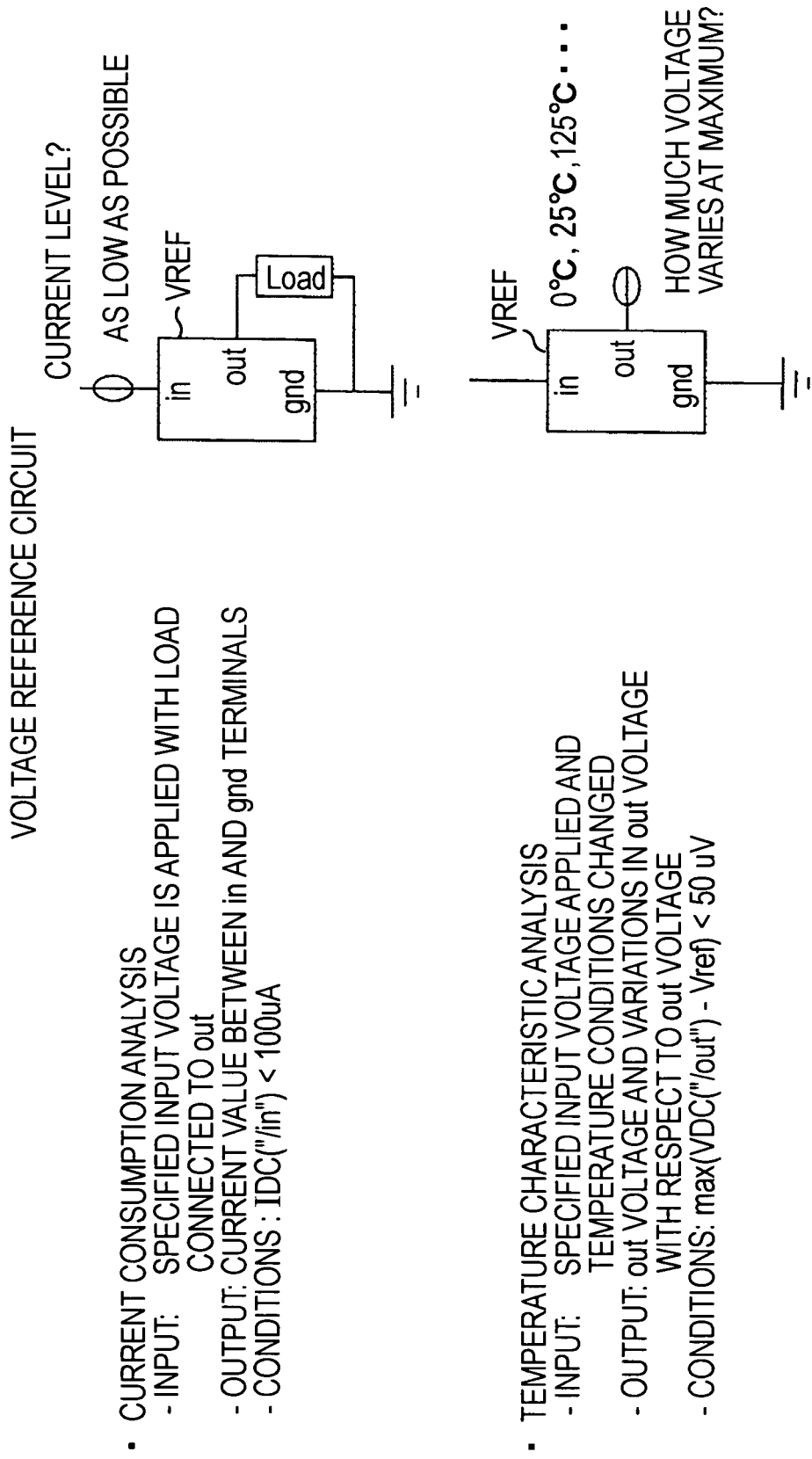
FIG. 6 illustrates generalized input and output of a reference circuit and conditions thereof in accordance with one embodiment of the present invention.

FIG. 6 illustrates a consumption current analysis and temperature characteristic analysis of VREF of the voltage reference circuit.

In the consumption current analysis, a specified input voltage is input and a load is connected to an output terminal out. An output of the voltage reference circuit is a current flowing through in and gnd terminals. The condition equation is IDC ("/in")<100 μA.

In the temperature characteristic analysis, a specified input voltage is applied with temperature conditions changed. An output of the voltage reference circuit includes an out voltage value and variations in the out voltage value with respect to a voltage value stated in specifications. A condition equation is max(VDC("/out") Vref)<50 μV.

FIG. 7 illustrates an input-output response time analysis and output settling time analysis of the ADC circuit.

In the input-output response time analysis, an analog sinusoidal waveform signal is input. An output of the ADC circuit is an out signal waveform. A condition equation is delay(VT ("/out")VT("/in")Vth1 Vth2).

In the output settling time analysis, an analog sinusoidal wave signal is input. An output of the ADC circuit is an out signal waveform. An condition equation is setting Time (VT ("/OUT")−0.9 nil 0.9 nil).

Operation of the apparatus of FIG. 1 is described in conjunction with FIGS. 8-14.

Figure 8:
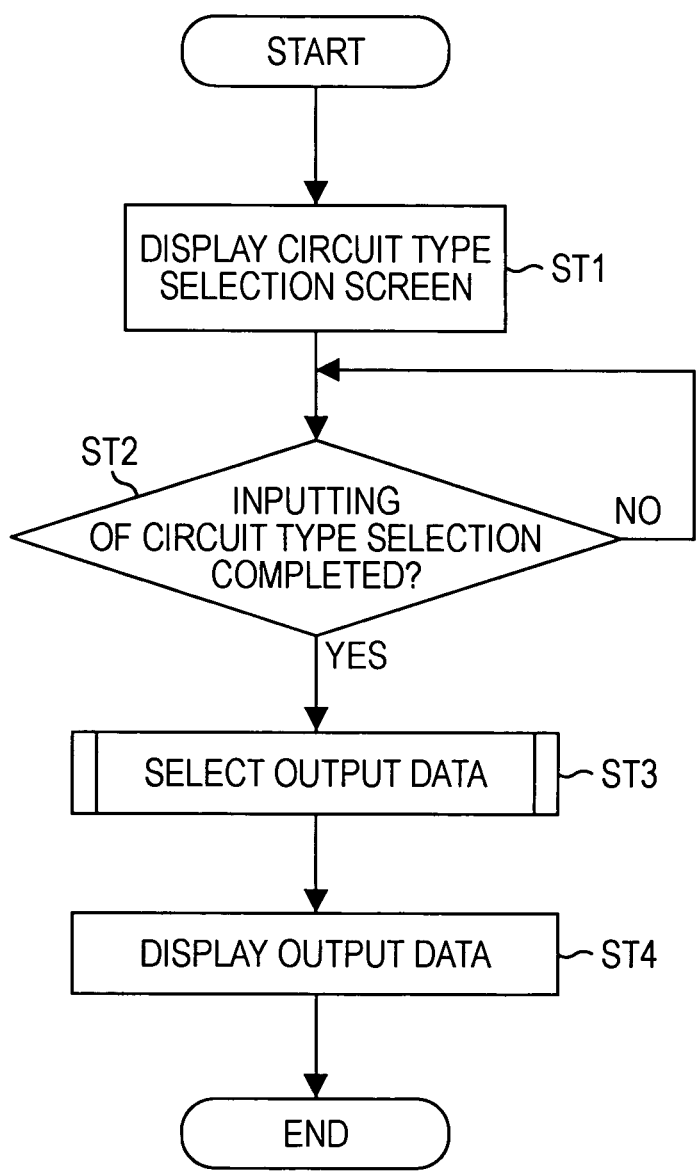
FIG. 8 is a flowchart generally illustrating operation of the circuit optimization information management apparatus in accordance with one embodiment of the present invention.
Figure 9:
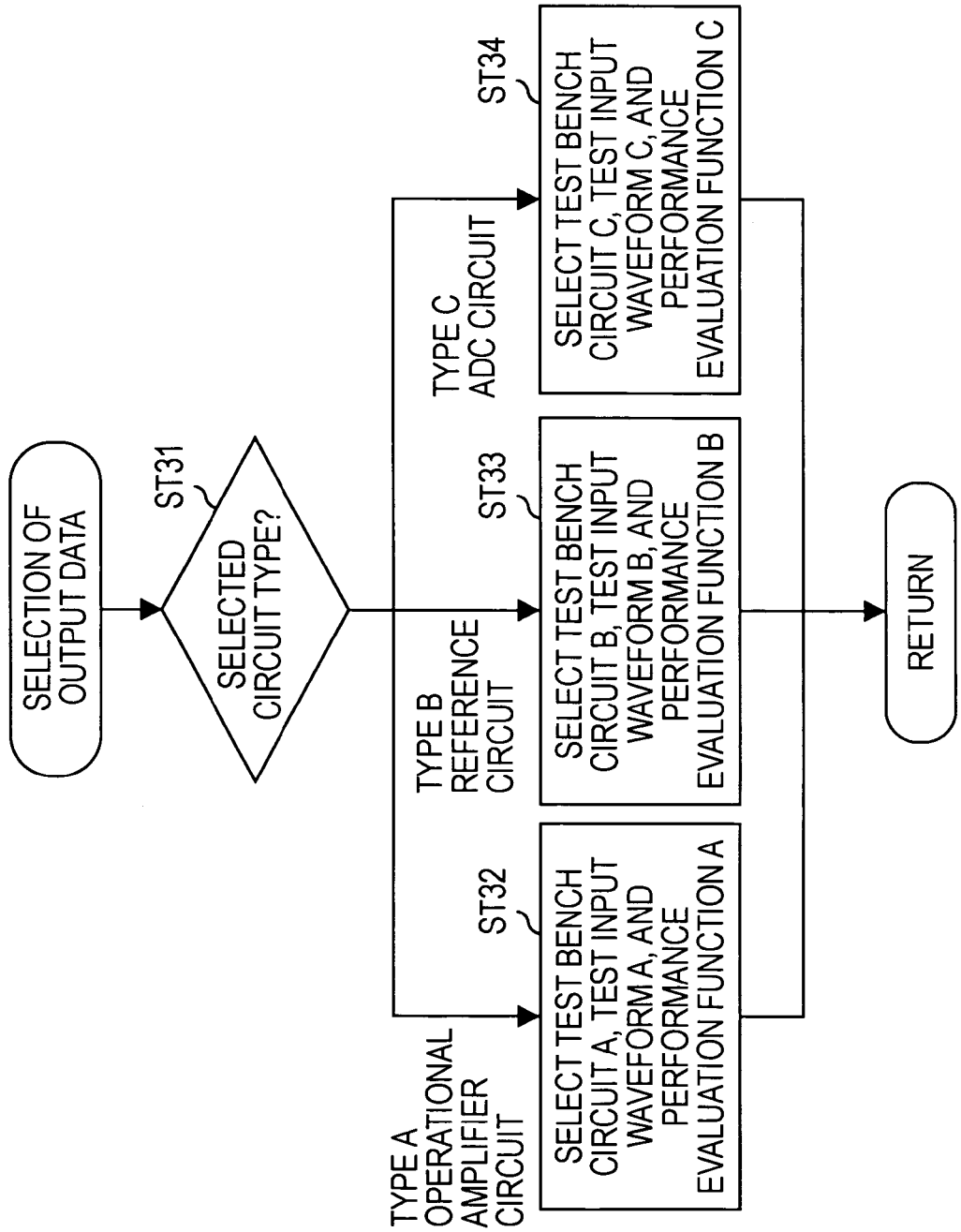
FIG. 9 is a flowchart illustrating an output data selecting step of FIG. 8.
Figure 10:
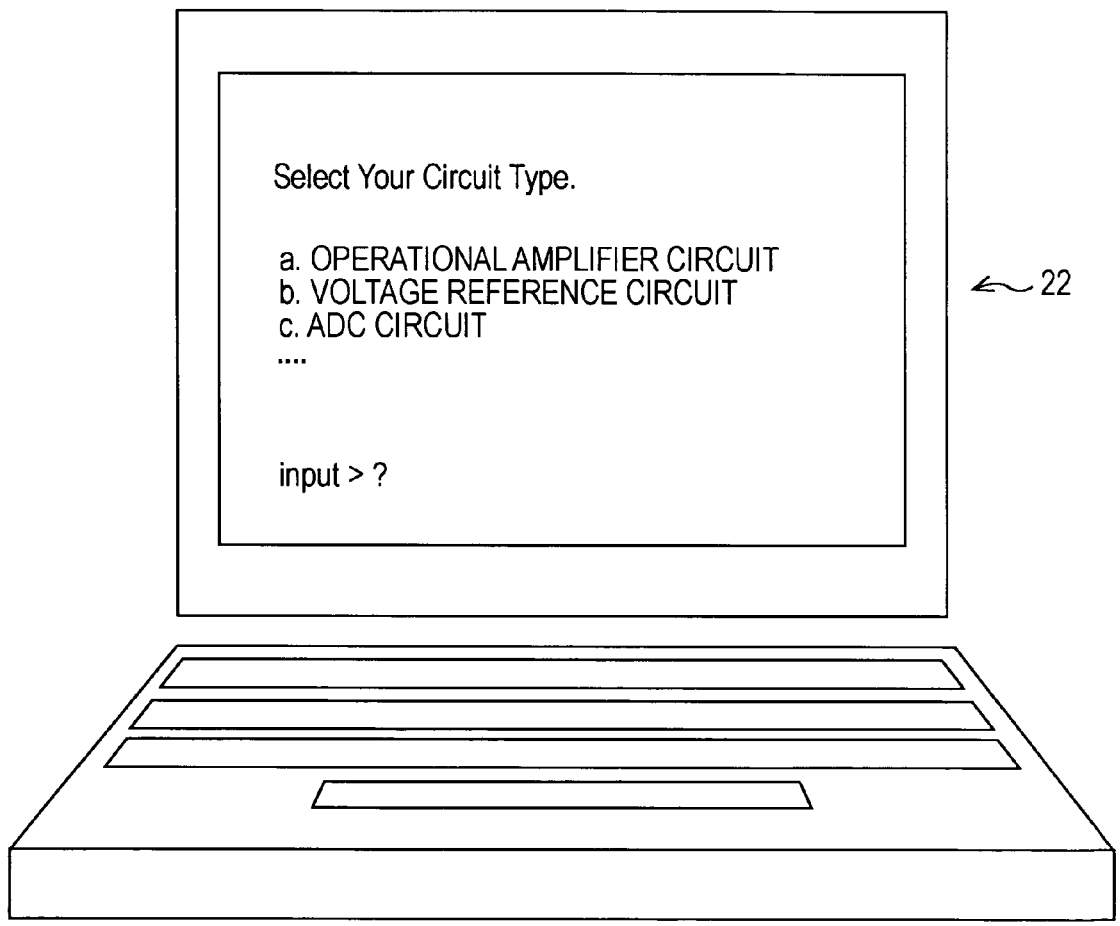
FIG. 10 illustrates a circuit type candidate display selection process in accordance with one embodiment of the present invention.
Figure 11:
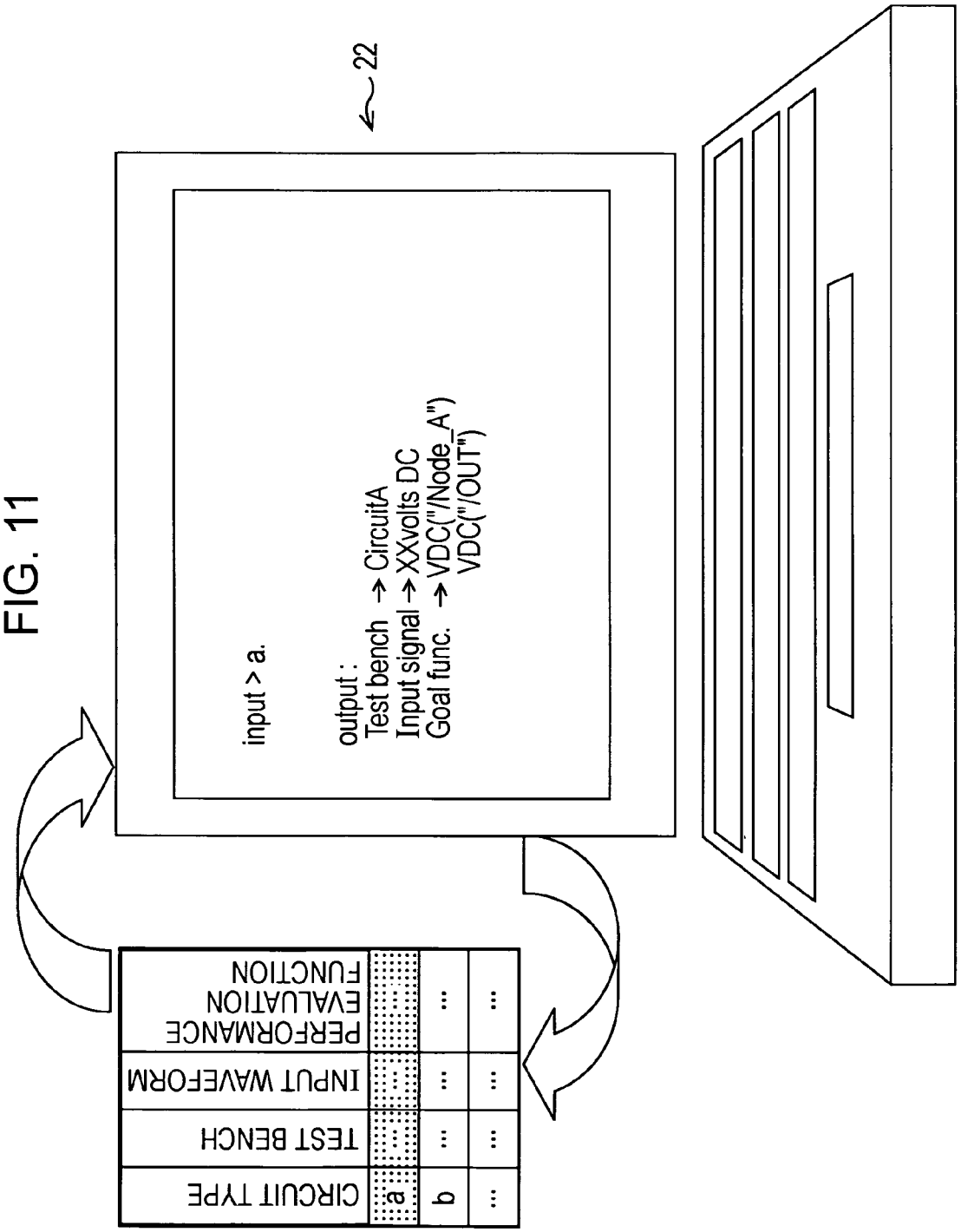
FIG. 11 illustrates an output process of outputting a test bench, an input waveform and a performance evaluation function in accordance with one embodiment of the present invention.
Figure 12:
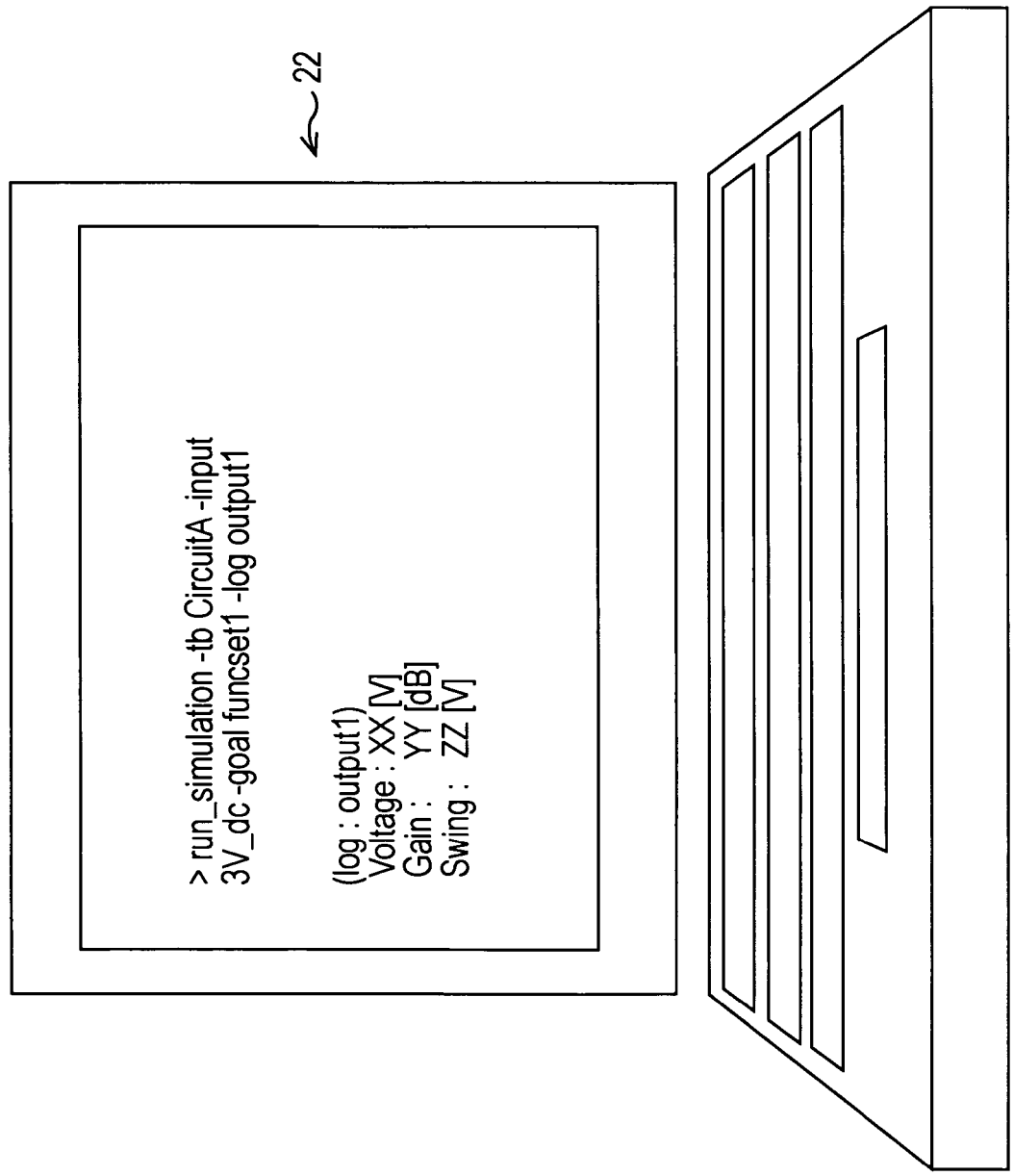
FIG. 12 illustrates a simulation result evaluation process in accordance with one embodiment of the present invention.
Figure 13:
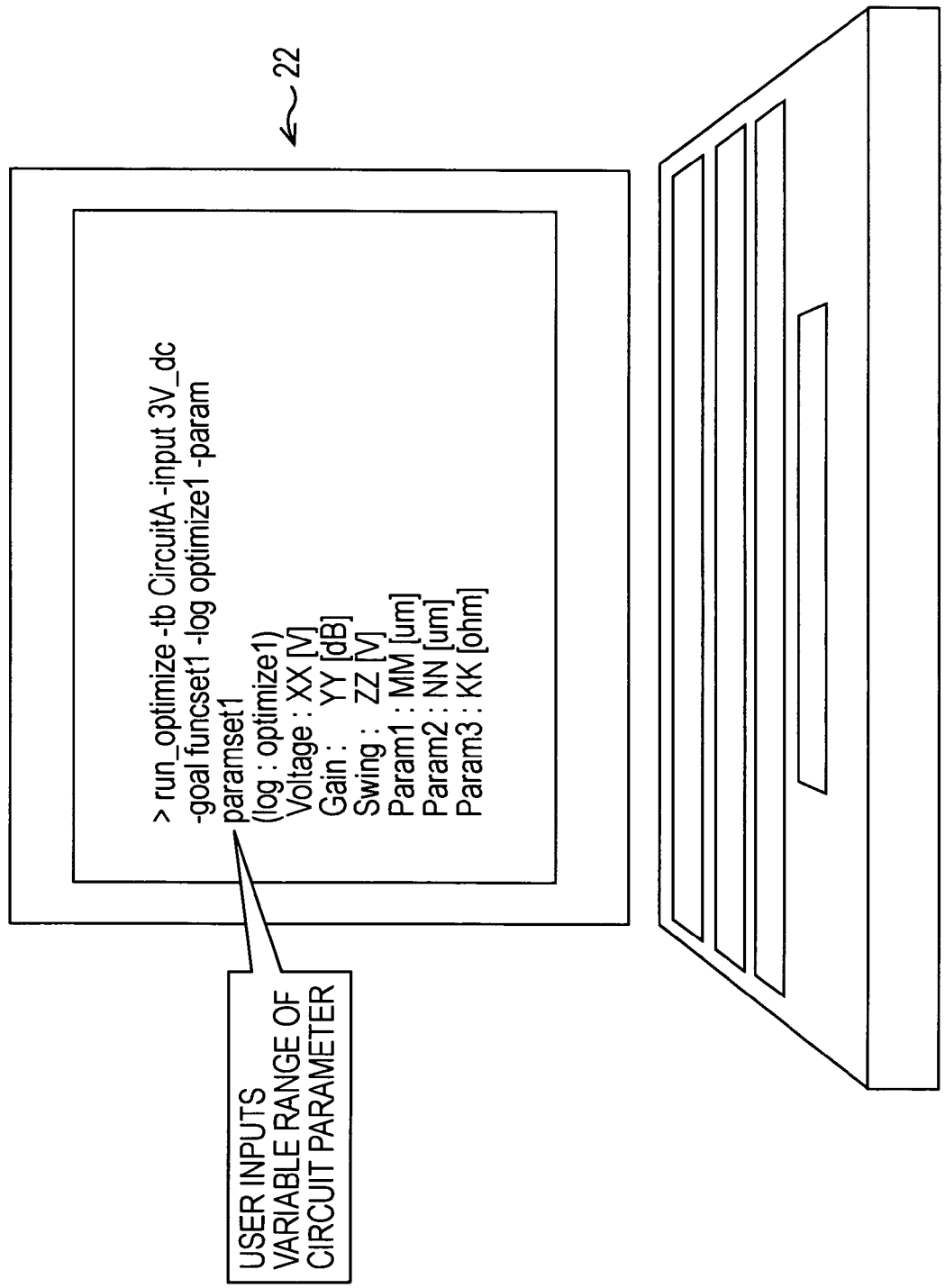
FIG. 13 illustrates a circuit parameter optimization program receiving data output from the circuit optimization information management apparatus in accordance with one embodiment of the present invention.

FIG. 8 is a flowchart illustrating the general operation of the circuit optimization information management system 1. FIG. 9 is a flowchart illustrating an output data selection step of FIG. 8. FIG. 10 illustrates a display selection process of a circuit type candidate. FIG. 11 illustrates an output process of the test bench, the input waveform and the performance evaluation function. FIG. 12 illustrates an evaluation process of the simulation results. FIG. 13 illustrates a usage of the circuit parameter optimization program receiving data output from the circuit optimization information management apparatus.

One of the user and system administrator registers beforehand a circuit type and a test bench circuit, a test input waveform and a performance evaluation function, each corresponding to the circuit type as shown in FIG. 2.

The circuit optimization information management system 1 of one embodiment of the present invention under the control of the controller 28 reads a plurality of circuit types pre-registered and displays the circuit types on the display 22 (step ST1). With reference to FIG. 10, the circuit optimization information management system 1 prompts one of the user and system administrator to input the circuit type. The display screen of the display 22 may be graphic user interface (GUI).

The user (design engineer) of the circuit optimization information management system 1 selects a circuit type as a design target from among the displayed circuit type candidates and input the selected circuit type to the input receiver 21 (step ST2).

As shown in FIG. 11, the circuit optimization information management system 1 under the control of the controller 28 selects the information relating to the test bench circuit, the test input waveform and the performance evaluation function, corresponding to the input circuit type stored on the input and generation information accumulator 23. The circuit optimization information management system 1 then outputs the test bench circuit, the test input waveform and the performance evaluation function to the circuit parameter optimization program 3 respectively via the TB output unit 25, the test input waveform output unit 26 and the evaluation function output unit 27 (step ST3). The output data is then displayed (step ST4).

The circuit optimization information management system 1 outputs circuit optimization data corresponding to the circuit type.

As shown in FIG. 9, the circuit optimization information management system 1 determines the selected circuit type (step ST31). If the selected circuit type is A, for example, the selected circuit type is an operational amplifier OpAmp. The circuit optimization information management system 1 reads and outputs to the input and generation information accumulator 23 a test bench circuit A, a test input waveform A and a performance evaluation function A, corresponding to the circuit type A (step ST32).

If the circuit type selected in step ST31 is a circuit type B, the circuit optimization information management system 1 determines the selected circuit type as being a reference circuit. The circuit optimization information management system 1 selects and outputs a test bench circuit B, a test input waveform B and a performance evaluation function B registered corresponding to the circuit type B to the input and generation information accumulator 23 (step S33).

If the circuit type selected in step ST31 is a circuit type C, the circuit optimization information management system 1 determines the selected circuit type as being an ADC circuit. The circuit optimization information management system 1 selects and outputs a test bench circuit C, a test input waveform C and a performance evaluation function C registered corresponding to the circuit type C to the input and generation information accumulator 23 (step S34).

Only names of test benches are shown here. In practice, the information may be output in a format that can be directly applied to a simulator (such as in a net list format).

If a GUI is used, a schematic may be graphically displayed.

Returning to FIG. 8, the user simulates a design target circuit using the information relating to the test bench circuit and the test input waveform as the output results of the circuit optimization information management system 1.

As shown in FIG. 12, the user executes a simulation operation using the output data (run_simulation=simulation execution command).

In this example, the DC voltage, gain and voltage amplitude are calculated using the performance evaluation function of the system and output.

The user evaluates the simulation results using the performance evaluation function as the output results of the system.

With reference to FIG. 13, the user may use the output results of the circuit optimization information management system 1 as data to be input to the circuit parameter optimization program.

For example, the user enters a variable range of a circuit parameter.

In addition to the process of FIG. 12, the user executes the circuit parameter optimization program (for example, run_optimize) by specifying a circuit parameter to be optimized (with -param attached, for example).

The optimum value of each parameter satisfying the specifications and the calculation results of the performance evaluation function corresponding to the optimum value are thus output.

The design engineer simply uses the resulting value of the parameter variable in the target design circuit to satisfy specifications.

Since a common evaluation function registered in the database is used, consistent results in the specifications are obtained in a manner free from variations. For example, the obtained results are free from a discrepancy in which the same results are satisfactory to one design engineer but unsatisfactory to another.

The user produce the evaluation function and the specifications may be satisfied immediately or may not be satisfied at all depending on how the evaluation function is produced.

In accordance with one embodiment of the present invention, the user registers the test bench in a format matching each simulation environment, the waveform information (data) to be input to the test bench, and the performance evaluation function readable by the circuit parameter optimization program.

These pieces of information (data) is sorted according to circuit type.

In accordance with one embodiment of the present invention, circuit specifications are recorded as the performance evaluation function for ease of use in the circuit parameter optimization program.

In the circuit parameter optimization program, specifications are provided as a function of simulation results in optimization.

By sharing the function among circuit design engineers on a per circuit type basis, the function is produced within shorter time and variations in the optimization results due to the manner of incorporating the function are controlled.

The register 24 generates a desired performance evaluation function equation based on information that accounts for the performance evaluation results obtained through the simulation of the circuit parameter optimization program 3. The register 24 registers the performance evaluation function equation with the circuit type associated therewith. The circuit type is specified by the user of the input and generation information accumulator 23 and received by the input receiver 21. That process is described below.

The process of generating the performance evaluation function based on the simulation results is described below with reference to FIG. 14.

The performance evaluation function includes the values of points at a waveform and a difference between two different waves and a graph within a waveform window is directly selected to obtain the performance evaluation function.

Operation 1

The user clicks and drags a start point to a point of measurement and then release a mouse button.

Operation 2

The circuit optimization information management system 1 extracts one or two waveform equations specified by the user (for example, VT("/OUT") and VT("/IN"")) from the simulation results.

Operation 3

The circuit optimization information management system 1 reads coordinates at the point where the user has clicked or dragged and adds one of a Xvalue function and a Yvalue function to the equations (for example, VT("/OUT") or VT("/IN")).

If the selected point is in a vertical direction, Y value is selected. If the selected point is shifted in a horizontal direction, the Xvalue function is selected. If the selected point is shifted in a slant direction, both the Yvalue function and the Xvalue function are used (example 3 of FIG. 4).

In the example 3, the equation is expressed as follows:

(Yvalue(VT("/OUT")30 m)−Yvalue(VT("/IN")20 m))

or (Xvalue(VT("/OUT")2V)−Xvalue(VT("/IN")3V))

Operation 4

The circuit optimization information management system 1 generates a waveform equation of one waveform if the mouse operation starting point is on one of the X axis and the Y axis (example 1 of FIG. 14) or generates a difference equation of two waveforms if the mouse operation starting point is on another waveform (examples 2 and 3 of FIG. 14).

In the example 1, the equation is:

(Yvalue(VT("/OUT")10 m)

In the example 2, the equation is:

(Yvalue(VT("/OUT")50 m)−Yvalue(VT("/IN")50 m))

Operation 5

The circuit optimization information management system 1 registers the equation generated in the operation 4 as the performance evaluation function for the circuit type specified by the user of the input and generation information accumulator 23 as the database DB (since there are two functions in the case of a slant direction, the user may select one of the two equations).

If a graph is selected, values (such as voltage or current) are provided in response. In the operation 5, the equation of a waveform (corresponding to the performance evaluation function) is provided in response.

Any waveform is expressed by a corresponding equation and that equation may be provided (example 1).

If the operation 5 is performed between two graphs, a difference between the two equations may be provided (example 2).

A circuit type used in the design target circuit is selected from a list of circuit types defined beforehand. The simulation test bench circuit for the selected circuit type, the test input waveform to the simulation test bench circuit and the circuit performance evaluation function for evaluating the simulation results are output.

In this way, time for producing manually the test bench circuit and the test input waveform in design is reduced. The test bench circuit, the test input circuit and the performance evaluation function, output from the system, are used as inputs to the circuit parameter optimization program. Time to produce manually input data to the circuit parameter optimization program is reduced. By sharing the evaluation function, variations in the optimization results due to the manner of incorporating the function are controlled.

In accordance with one embodiment of the present invention, the test bench and the performance evaluation function, used when the circuit parameter optimization program is used in the design of the analog integrated circuit, are automatically produced from the design circuit type. Workload on circuit design engineers is thus reduced and a test environment not directly dependent on the ability of each circuit design engineers is provided.

In accordance with embodiments of the present invention, time to produce manually the test bench circuit and the test input waveform is reduced.

Time to produce the test bench circuit, the test input waveform and the performance evaluation function is reduced in the inputting to the circuit parameter optimization program.

The test bench circuit, the test input waveform and the performance evaluation function, unique to each circuit type, are provided. A common simulation environment is thus constructed even in different designs.

Simulation and evaluation environments free from variations and not dependent on difference in ability of design engineers are provided.

If simulation output waveform evaluation is performed based on visual check during circuit performance evaluation, any circuit performance evaluation function for simulation is not present. The user thus prepares the performance evaluation function as an input to the circuit parameter optimization program.

Since the output of the system of embodiments of the present invention contains the circuit performance evaluation function, the output is directly used as an input to the circuit parameter optimization program.

In accordance with embodiments of the present invention, any change in a signal can be represented by a waveform, the performance evaluation function is extracted from a "waveform graph" the design engineer uses to verify circuit performance.

The performance evaluation function is derived based on equation making rather than knowledge of each design engineer. From among the test bench, the input waveform and the performance evaluation function, the one the user cannot easily produce is the performance evaluation function. In accordance with one embodiment of the present invention, the performance evaluation function is easily produced.

Since the database is easily constructed, the user can flexibly perform a registration operation and a deletion operation on the database in the design process.

Without full understanding of the format of the performance evaluation function representing the measurement point, the user cannot even enter a new measurement point to the design specifications (performance evaluation function) during circuit optimization.

In accordance with embodiments of the present invention, the performance evaluation function is obtained from the waveform without being dependent on the skill of each design engineer.

The processing steps described above may be implemented into a computer program and executed by a computer such as a CPU.

The computer program may be stored on a recording medium such as a semiconductor memory, a magnetic disk, an optical disk, or a floppy disk (registered trademark), and the computer with such a recording medium loaded thereon executes the computer program.

It should be understood by those skilled in the art that various modifications, combinations, sub-combinations and alterations may occur depending on design requirements and other factors insofar as they are within the scope of the appended claims or the equivalents thereof.

What is claimed is:

1. A circuit optimization information management apparatus, the apparatus comprising:
  a central processing unit operable to:
    register information relating to a circuit type used in a design target circuit, a simulation test bench circuit corresponding to the circuit type, a simulation test input waveform, and a circuit performance evaluation function for evaluating simulation results;
    transfer to a circuit parameter optimization program, in response to a selection of the circuit type used in the design target circuit, the information relating to the simulation test bench circuit, the simulation test input waveform and the circuit performance evaluation function, corresponding to the selected circuit type, wherein the circuit performance evaluation function is extracted from a predetermined waveform graph;

extract at least one specified waveform equation from the simulation results;

generate an equation by adding, to the at least one extracted specified waveform equation, coordinates information responsive to a click or a drag within a waveform window by a user; and register the generated equation as the circuit performance evaluation function corresponding to the circuit type.

2. The circuit optimization information management apparatus according to claim 1, wherein the central processing unit is operable to:

generate a desired performance evaluation function based, at least in part, on the simulation results from the circuit parameter optimization program; and register the generated desired performance evaluation function with the corresponding circuit type in association therewith.

3. The circuit optimization information management apparatus according to claim 1, wherein the central processing unit is operable to receive the selection of the circuit type.

4. The circuit optimization information management apparatus according to claim 3, wherein the central processing unit is operable to display the information relating to the selected circuit type, the information transferred to the circuit parameter optimization program in response to the selected circuit type, and another information relating to simulation execution and the simulation results from the circuit parameter optimization program; and receive input corresponding to a displayed content.

5. The circuit optimization information management apparatus according to claim 1, wherein the central processing unit is operable to store the information relating to the circuit type used in the design target circuit, the simulation test bench circuit corresponding to the circuit type, the simulation test input waveform, and the circuit performance evaluation function, received from an input receiver.

6. The circuit optimization information management apparatus according to claim 5, wherein the stored information is permitted to be modified, wherein the modification comprises one or more of: adding, updating or deleting.

7. The circuit optimization information management apparatus according to claim 1, wherein the circuit type comprises one of: an operational amplifier, a voltage reference circuit and an analog-to-digital converter circuit.

8. The circuit optimization information management apparatus according to claim 1, wherein the information relating to the test bench circuit comprises one or more of: a direct current analysis, an alternating current (AC) analysis and a transitional analysis.

9. The circuit optimization information management apparatus according to claim 8, wherein the AC analysis comprises analysis of gain and phase margin.

10. The circuit optimization information management apparatus according to claim 1, wherein the simulation test input waveform comprises one of: a bias input, an alternating current signal, a rectangular wave and a sinusoidal wave.

11. A circuit optimization information management method, the method comprising:

registering information relating to a circuit type used in a design target circuit, a simulation test bench circuit corresponding to the circuit type, a simulation test input waveform and a circuit performance evaluation function for evaluating simulation results;

transferring, in response to a selection of the circuit type used in the design target circuit, the information relating to the test bench circuit, the test input waveform and the circuit performance evaluation function, corresponding to the selected circuit type to a circuit parameter optimization program, wherein the circuit performance evaluation function is extracted from a predetermined waveform graph;

generating a desired performance evaluation function based, at least in part, on simulation results from the circuit parameter optimization program; and registering the generated desired performance evaluation function with the corresponding circuit type in association therewith, wherein generating the desired performance evaluation function comprises:

extracting at least one specified waveform equation from the simulation results; and generating an equation by adding, to the at least one extracted specified waveform equation, coordinates information responsive to a click or a drag within a waveform window by a user, wherein registering the generated desired performance evaluation function comprises registering the generated equation as the circuit performance evaluation function corresponding to the selected circuit type.

12. A computer program for circuit optimization information management stored on a non-transitory computer readable medium that, when executed by a computer enables the computer to perform steps comprising:

registering information relating to a circuit type used in a design target circuit, a simulation test bench circuit corresponding to the circuit type, a simulation test input waveform and a circuit performance evaluation function for evaluating simulation results;

transferring, in response to a selection of the circuit type used in the design target circuit, the information relating to the test bench circuit, the test input waveform and the circuit performance evaluation function, corresponding to the selected circuit type to a circuit parameter optimization program, wherein the circuit performance evaluation function is extracted from a predetermined waveform graph;

generating a desired performance evaluation function based, at least in part, on simulation results from simulation by the circuit parameter optimization program; and registering the desired performance evaluation function with the corresponding circuit type in association therewith, wherein generating the desired performance evaluation function comprises:

extracting at least one specified waveform equation from the simulation results; and generating an equation by adding, to the at least one extracted specified waveform equation, coordinates information responsive to a click or a drag within a waveform window by a user, wherein registering the generated desired performance evaluation function comprises registering the generated equation as the circuit performance evaluation function corresponding to the selected circuit type.

* * * * *